United States Patent [19]

Matsushita et al.

[11] Patent Number: 5,883,171
[45] Date of Patent: Mar. 16, 1999

[54] HEAT-CURABLE SILICONE RUBBER COMPOSITION

[75] Inventors: Takao Matsushita; Osamu Takuman, both of Chiba Prefecture, Japan

[73] Assignee: Dow Corning Toray Silicone Co., Ltd., Tokyo, Japan

[21] Appl. No.: 910,343

[22] Filed: Aug. 13, 1997

[30] Foreign Application Priority Data

Aug. 30, 1996 [JP] Japan .................................. 8-248630

[51] Int. Cl.⁶ ...................................................... C08K 3/26
[52] U.S. Cl. ........................................... 524/425; 524/588
[58] Field of Search ..................... 524/588, 425

[56] References Cited

U.S. PATENT DOCUMENTS

| | | | |
|---|---|---|---|
| 4,110,300 | 8/1978 | Matsushita | 524/424 |
| 4,485,206 | 11/1984 | Inoue | 524/783 |
| 4,560,719 | 12/1985 | Nakamura | 524/436 |
| 5,717,009 | 2/1998 | Matsushita | 523/212 |

*Primary Examiner*—Paul R. Michl
*Attorney, Agent, or Firm*—William F. Boley; Jennifer S. Warren

[57] ABSTRACT

A heat-curable silicone rubber composition whose cure provides silicone rubber with excellent high-voltage electrical insulating properties. The heat-curable silicone rubber composition comprises:

(A) polyorganosiloxane gum described by average compositional formula $$R_a SiO_{(4-a)/2},$$

where R represents substituted and unsubstituted monovalent hydrocarbon groups and a is a number from 1.95 to 2.05 and that contains at least 2 silicon-bonded alkenyl groups in each molecule, (B) microparticulate silica, (C) zinc carbonate powder or basic zinc carbonate powder, and (D) organoperoxide.

12 Claims, No Drawings

HEAT-CURABLE SILICONE RUBBER COMPOSITION

BACKGROUND OF INVENTION

This invention relates to heat-curable silicone rubber compositions. More particularly, this invention relates to a heat-curable silicone rubber composition whose cure yields silicone rubber that has a high mechanical strength and excellent electrical insulating properties and in particular excellent high-voltage electrical insulating properties.

Room temperature-curing silicone rubber compositions that contain zinc carbonate powder are already known (Japanese Patent Publication (Kokoku)Number Sho 53-15939 (15,939/1978)). These silicone rubber compositions cure to yield highly flame-retarded silicone rubbers. However, the cure of this type of silicone rubber composition develops gradually at room temperature in the presence of moisture through a condensation reaction, and several days are required for such compositions to cure completely. Moreover, the cured product has a low mechanical strength and cannot be used in some applications.

As a result of extensive investigations directed to solving the problems described above, the inventors discovered that the admixture of large amounts of zinc carbonate powder or basic zinc carbonate powder into a particular heat-curable silicone rubber composition provides silicone rubber with a high mechanical strength and excellent electric properties and in particular excellent high-voltage electrical insulating properties. The present invention was achieved as a result of this discovery.

Specifically, the object of the present invention is to provide a heat-curable silicone rubber composition that is cured by heating and thereby provides silicone rubber with a high mechanical strength and excellent electrical properties and in particular excellent high-voltage electrical insulating properties.

SUMMARY OF INVENTION

A heat-curable silicone rubber composition whose cure provides silicone rubber with excellent high-voltage electrical insulating properties. The heat-curable silicone rubber composition comprises:

(A) polyorganosiloxane gum described by average compositional formula

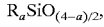

where R represents substituted and unsubstituted monovalent hydrocarbon groups and a is a number from 1.95 to 2.05 and that contains at least 2 silicon-bonded alkenyl groups in each molecule, (B) microparticulate silica, (C) zinc carbonate powder or basic zinc carbonate powder, and (D) organoperoxide.

DESCRIPTION OF INVENTION

The present invention is a heat-curable silicone rubber composition comprising:

(A) 100 weight parts polyorganosiloxane gum represented by average compositional formula

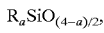

where R represents substituted and unsubstituted monovalent hydrocarbon groups and a is a number from 1.95 to 2.05 and that contains at least 2 silicon-bonded alkenyl groups in each molecule, (B) 1 to 60 weight parts microparticulate silica, (C) 50 to 200 weight parts zinc carbonate powder or basic zinc carbonate powder, and (D) 0.1 to 10 weight parts organoperoxide, and a heat-curable silicone rubber composition comprising the aforementioned composition of components (A) to (D) that also contains (E) 5 to 200 weight parts aluminum hydroxide powder.

To explain the preceding in greater detail, component (A), which is the base component of the present composition, is represented by the average compositional formula $R_a SiO_{(4-a)/2}$. R in this formula represents substituted and unsubstituted monovalent hydrocarbon groups, for example, alkyl groups such as methyl, ethyl, propyl, butyl, and octyl; alkenyl groups such as vinyl, allyl, butenyl, and hexenyl; aryl groups such as phenyl; and 3,3,3-trifluoropropyl, 2-phenylethyl, and 2-cyanoethyl. The subscript a is a number from 1.95 to 2.05. Component (A) contains at least 2 silicon-bonded alkenyl groups in each molecule. In component (A) the alkenyl may be bonded at terminal or non-terminal positions or at both positions. The molecular structure of component(A) can be straight chain or partially branched straight chain. The degree of polymerization of component (A) can generally be within the range of from 1,000 to 20,000. Component (A) may be a homopolymer or copolymer or a mixture of these polymers. The units that can be present in component (A) are exemplified by dimethylsiloxy, vinylmethylsiloxy, methylphenylsiloxy, and 3,3,3-trifluoropropylmethylsiloxy units. The molecular terminal groups in component (A) are exemplified by trimethylsiloxy, silanol, vinyldimethylsiloxy, and vinylmethylhydroxysiloxy. Component (A) can be a polyorganosiloxane gum exemplified by vinyldimethylsiloxy-endblocked dimethylsiloxane vinylmethylsiloxane copolymer gums, vinyldimethylsiloxy-endblocked dimethylpolysiloxane gums, silanol-endblocked dimethylsiloxane-vinylmethylsiloxane copolymer gums, and vinylmethylhydroxysiloxy-endblocked dimethylsiloxane-vinylmethylsiloxane copolymer gums.

The microparticulate silica (B), which is a reinforcing or semi-reinforcing filler, is an essential component that imparts mechanical strength to the silicone rubber afforded by the cure of the present composition. This microparticulate silica is exemplified by reinforcing microparticulate silicas such as dry-process silica (e.g., fumed silica) and wet-process silica (e.g., precipitated silica) and by semi-reinforcing microparticulate silicas such as quartz micropowder and diatomaceous earth. Component (B) preferably has a particle size $\leq 50$ μm and a specific surface area $\geq 50$ m$^2$/g. The surface hydrophobicization of the microparticulate silica with an organosilicon compound such as an organosilane, organosilazane, organosiloxane oligomer, etc., is also preferred. Component (B) is added at from 1 to 100 weight parts and preferably at from 10 to 60 weight parts, in each case per 100 weight parts component (A). The addition of less of component (B) will fail to provide a high mechanical strength, while admixture of component (B) into component (A) becomes highly problematic when larger amounts are added.

Component (C), which is zinc carbonate powder or basic zinc carbonate powder, is the component that characterizes the present invention. The admixture of component (C) provides a cured silicone rubber with excellent high-voltage electrical insulating properties. In order to avoid adverse effects on the mechanical strength, the particle size of component (C) is preferably ≦100 μm and particularly preferably is within the range of from 0.1 to 50 μm. Component (C) is preferably a zinc carbonate powder or basic zinc carbonate powder whose surface has been treated with an organosilicon compound selected from organosilanes, organosilazanes, organosiloxane oligomers, and mixtures of the preceding. The organosilicon compound used as the surface treatment agent for component (C) is exemplified by organochlorosilanes such as trimethylchlorosilane, dimethylchlorosilane, and methyltrichlorosilane; organotrialkoxysilanes such as methyltrimethoxysilane, methyltriethoxysilane, phenyltrimethoxysilane, ethyltrimethoxysilane, n-propyltrimethoxysilane, vinyltrimethoxysilane, vinyltriacetoxysilane, allyltrimethoxysilane, butenyltrimethoxysilane, hexenyltrimethoxysilane, and γ-methacryloxypropyltrimethoxysilane; diorganodialkoxysilanes such as dimethyldimethoxysilane, dimethyldimethoxysilane, and diphenyldimethoxysilane; triorganoalkoxysilanes such as trimethylmethoxysilane and trimethylethoxysilane; the partial condensates of the preceding organoalkoxysilanes; organosilazanes such as hexamethyldisilazane and divinyltetramethyldisilazane; silanol-, alkenyl-, or alkoxy-functional organosiloxane oligomers; and silanol-, alkenyl-, or alkoxy-functional organosilicon resins composed of the $SiO_2$ unit (Q unit) and $R^1SiO_{1.5}$ unit (T unit) in which $R^1$ is a monovalent hydrocarbon group, for example, alkyl such as methyl, ethyl, and propyl; alkenyl such as vinyl and allyl; and aryl such as phenyl. The surface of component(C) may be treated in a preliminary step in which the organosilicon compound functioning as surface treatment agent is added to component (C) followed by mixing in a mixing means such as a mixer, or may be treated in situ during preparation of the present heat-curable silicone rubber composition. Component (C) is added at from 50 to 200 weight parts per 100 weight parts component (A): the addition of less component (C) will not provide acceptable high-voltage electrical insulating properties, while the addition of more than 200 weight parts component (C) can reduce the mechanical strength of the present composition.

The organoperoxide (D) in the present composition is a curing agent that cures the composition upon the application of heat. The organoperoxides generally known for use as curing agents for heat-curable silicone rubber compositions can be used as component (D). These organoperoxides are exemplified by benzoyl peroxide, tert-butyl perbenzoate, o-methylbenzoyl peroxide, p-methylbenzoyl peroxide, dicumyl peroxide, and 2,5-dimethyl-2,5-di(tert-butylperoxy)hexane.

The aluminum hydroxide powder (E) provides excellent high-voltage electrical insulating properties when used in combination with component (C). The surface of component (E) is preferably treated with an organosilicon compound selected from organosilanes, organosilazanes, organosiloxane oligomers, and mixtures of the preceding. The particle size of component (E) is preferably from 0.1 to 50 μm and more preferably is from 0.1 to 10 μm. As for component (C), the surface of component(E) may be treated in a preliminary step in which the organosilicon compound functioning as surface treatment agent is added to component (E) followed by mixing in a mixing means such as a mixer, or may be treated in situ during preparation of the present heat-curable silicone rubber. Component (E) is added at from 5 to 200 weight parts per 100 weight parts component (A).

The present composition comprising the aforementioned components (A) to (D) or (A) to (E), may in addition contain, insofar as the object of the invention is not impaired, the various additives known for addition to heat-curable silicone rubber compositions, for example, pigments, heat stabilizers, and internal release agents. The pigments are exemplified by titanium oxide, carbon black, and iron oxide red. The heat stabilizers are exemplified by rare-earth oxides, rare-earth hydroxides, cerium silanolate, and the fatty acid salts of cerium.

The present composition can be prepared simply by mixing components (A) to (D) or (A) to (E) to homogeneity in their prescribed quantities. The mixing sequence for components (A) to (E) is not critical. However, in a preferred sequence, a silicone rubber base compound is first prepared by mixing components (A) to (C) or (A), (B), (C), and (E) to homogeneity using a known mixer such as a kneader mixer, continuous twinscrew compounding extruder, or two-roll mill, and then homogeneously mixing component (D) into the resulting base compound using a mixer such as a two-roll mill or kneader mixer.

The present composition cures to give silicone rubber that Adexhibits excellent electrical insulating properties and is therefore highly qualified for use in applications that require such properties, for example, as electrical insulation in high-voltage electrical devices and instruments.

The present invention will be explained below through working examples. In the examples "part" indicates "weight part" and the values reported for the viscosity were measured at 25° C. The physical properties reported in the examples were measured in accordance with JIS K 6301. The electrical properties were measured by the following methods.

Electrical property measurements were carried out in accordance with JIS C 2123, "Test Methods for Electrical Silicone Rubber Compounds". A "High Resistance Meter 4339A" from Hewlett-Packard was used for the volume resistivity. The dielectric constant and dielectric dissipation factors were measured at 110 Hz using an automatic instrument for measuring dielectric loss (Model TR-1100 from Ando Electric Co., Ltd.). The tracking test was run in accordance with the inclined plane anti-tracking test stipulated in IEC Publication 587 using a model HAT-520 from Hitachi Kasei Kogyo Kabushiki Kaisha. The test voltage was 3.5 kV. The criterion A referenced in the tables refers to the time required until the current flowing in a high-voltage circuit through the test specimen exceeded 60 mA. The criterion B referenced in the tables refers to the time for tracking to reach a mark placed on the surface of the test specimen at a position 25 mm from the lower electrode.

EXAMPLE 1

100 Parts vinyldimethylsiloxy-endblocked dimethylsiloxane-vinylmethylsiloxane copolymer gum (degree of polymerization=3,000, 99.87 mol % dimethylsiloxy units and 0.13 mol % vinylmethylsiloxy units) was mixed to homogeneity using a kneader mixer with 30 parts dimethyldichlorosilane-treated fumed silica (specific surface=120 m²/g) and 3 parts silanol-endblocked polydimethylsiloxane (viscosity=30 mPa.s) as plasticizer. This was followed by the addition of 150 parts zinc carbonate powder (average particle size=10 μm) without heating to give a silicone rubber base compound.

0.8 Part of a 50 weight % silicone oil paste master batch of 2,5-dimethyl-2,5-di(tert-butylperoxy)hexane was kneaded to homogeneity on a two-roll mill into 100 parts of the silicone rubber base compound to give a heat-curable silicone rubber composition.

A 2 mm-thick silicone rubber sheet was molded by press vulcanizing this heat-curable silicone rubber composition at 170° C. for 10 minutes. The electrical and physical properties were measured on this silicone rubber sheet, and the results of these measurements are reported in Table 1.

COMPARATIVE EXAMPLE 1

A heat-curable silicone rubber composition was prepared as in Example 1, but in this case omitting the zinc carbonate powder that was used in Example 1. The electrical and physical properties were measured on this heat-curable silicone rubber composition as in Example 1, and the results of these measurements are reported in Table 1.

TABLE 1

|  | Example 1 | Comparative Example 1 |
| --- | --- | --- |
| composition |  |  |
| zinc carbonate powder (parts) | 150 | — |
| physical properties |  |  |
| durometer (JIS A) | 55 | 30 |
| tensile strength (MPa) | 2.8 | 8.5 |
| elongation (%) | 500 | 750 |
| tear strength (A) (N/mm) | 14 | 12 |
| tracking resistance |  |  |
| criterion A (minutes) | ≧360 | 55 |
| criterion B (minutes) | ≧360 | 35 |
| electrical properties |  |  |
| volume resistivity (Ω-cm) | $3.0 \times 10^{13}$ | $1.5 \times 10^{15}$ |
| dielectric constant | 4.8 | 3.6 |
| dielectric dissipation factor | $8.9 \times 10^{-2}$ | $9.0 \times 10^{-3}$ |

EXAMPLE 2

100 Parts vinyldimethylsiloxy-endblocked dimethylsiloxane-vinylmethylsiloxane copolymer gum (degree of polymerization=3,000, 99.87 mol % dimethylsiloxy units and 0.13 mol % vinylmethylsiloxy units) was mixed to homogeneity using a kneader mixer with 30 parts dimethyldichlorosilane-treated fumed silica (specific surface=120 m$^2$/g) and 3 parts silanol-endblocked polydimethylsiloxane (viscosity=30 mPa.s) as plasticizer. This was followed by the addition of 150 parts zinc carbonate powder (average particle size=10 μm) and 1.5 parts vinyltrimethoxysilane with additional mixing. The resulting mixture was heated at 100° C. for 30 minutes to give a silicone rubber base compound.

0.8 Part of a 50 weight % silicone oil paste master batch of 2,5-dimethyl-2,5-di(tert-butylperoxy)hexane was kneaded to homogeneity on a two-roll mill into 100 parts of the silicone rubber base compound to give a heat-curable silicone rubber composition with a plasticity of 450 mm/100.

A 2 mm-thick silicone rubber sheet was molded by press vulcanizing this heat-curable silicone rubber composition at 170° C. for 10 minutes. The electrical and physical properties were measured on this silicone rubber sheet, and the results of these measurements are reported in Table 2.

EXAMPLE 3

100 Parts vinyldimethylsiloxy-endblocked dimethylsiloxane-vinylmethylsiloxane copolymer gum (degree of polymerization=3,000, 99.87 mol % dimethylsiloxy units and 0.13 mol % vinylmethylsiloxy units) was mixed to homogeneity using a kneader mixer with 30 parts dimethyldichlorosilane-treated fumed silica (specific surface=120 m$^2$/g) and 3 parts silanol-endblocked polydimethylsiloxane (viscosity=30 mPa.s) as plasticizer. This was followed by the addition of 100 parts zinc carbonate powder (average particle size=10 μm), 50 parts aluminum hydroxide powder, and 1.5 parts vinyltrimethoxysilane with additional mixing. The resulting mixture was heated at 100° C. for 30 minutes to give a silicone rubber base compound.

0.8 Part of a 50 weight % silicone oil paste master batch of 2,5-dimethyl-2,5-di(tert-butylperoxy)hexane was kneaded to homogeneity on a two-roll mill into 100 parts of the silicone rubber base compound to give a heat-curable silicone rubber composition with a plasticity of 380 mm/100.

A 2 mm-thick silicone rubber sheet was molded by press vulcanizing this heat-curable silicone rubber composition at 170° C. for 10 minutes. The electrical and physical properties were measured on this silicone rubber sheet, and these results are reported in Table 2.

TABLE 2

|  | Example 2 | Example 3 |
| --- | --- | --- |
| composition |  |  |
| zinc carbonate powder (parts) | 150 | 100 |
| aluminum hydroxide powder (parts) | — | 50 |
| physical properties |  |  |
| durometer (JIS A) | 83 | 77 |
| tensile strength (MPa) | 5.3 | 4.3 |
| elongation (%) | 120 | 150 |
| tear strength (A) (N/mm) | 16 | 12 |
| tracking resistance |  |  |
| criterion A (minutes) | ≧360 | ≧360 |
| criterion B (minutes) | ≧360 | ≧360 |
| electrical properties |  |  |
| volume resistivity (Ω-cm) | $7.0 \times 10^{13}$ | $1.5 \times 10^{14}$ |
| dielectric constant | 5.5 | 4.0 |
| dielectric dissipation factor | $6.6 \times 10^{-2}$ | $1.8 \times 10^{-3}$ |

EXAMPLE 4

100 Parts vinyldimethylsiloxy-endblocked dimethylsiloxane-vinylmethylsiloxane copolymer gum (degree of polymerization=3,000, 99.87 mol % dimethylsiloxy units and 0.13 mol % vinylmethylsiloxy units) was mixed to homogeneity using a kneader mixer with 30 parts dimethyldichlorosilane-treated fumed silica (specific surface=120 m$^2$/g) and 3 parts silanol-endblocked polydimethylsiloxane (viscosity=30 mPa.s) as plasticizer. This was followed by the addition with mixing to homogeneity of 150 parts zinc carbonate powder (average particle size=10 μm) and, as surface-treatment agent, 2 parts hexamethyldisilazane and 0.6 part water. The resulting mixture was heated at 120° C. for 1 hour under a vacuum to give a silicone rubber base compound.

0.8 Part of a 50 weight % silicone oil paste master batch of 2,5-dimethyl-2,5-di(tert-butylperoxy)hexane was kneaded to homogeneity on a two-roll mill into 100 parts of the silicone rubber base compound to give a heat-curable silicone rubber composition.

A 2 mm-thick silicone rubber sheet was molded by press vulcanizing this heat-curable silicone rubber composition at 170° C. for 10 minutes. The electrical and physical properties were measured on this silicone rubber sheet, and the results of these measurements are reported in Table 3.

EXAMPLE 5

100 Parts vinyldimethylsiloxy-endblocked dimethylsiloxane-vinylmethylsiloxane copolymer gum (degree of polymerization=3,000, 99.87 mol % dimethylsiloxy units and 0.13 mol % vinylmethylsiloxy units) was mixed to homogeneity using a kneader mixer with 30 parts dimethyldichlorosilane-treated fumed silica (specific surface=120 m$^2$/g), 150 parts zinc carbonate powder (average particle size=10 μm), and 6 parts silanol-endblocked polydimethylsiloxane (viscosity=30 mPa.s) as surface-treatment agent. The resulting mixture was heated at 120° C. for 1 hour to give a silicone rubber base compound.

0.8 Part of a 50 weight % silicone oil paste master batch of 2,5-dimethyl-2,5-di(tert-butylperoxy)hexane was kneaded to homogeneity on a two-roll mill into 100 parts of the silicone rubber base compound to give a heat-curable silicone rubber composition.

A 2 mm-thick silicone rubber sheet was molded by press vulcanizing this heat-curable silicone rubber composition at 170° C. for 10 minutes. The electrical and physical properties were measured on this silicone rubber sheet, and the results of these measurements are reported in Table 3.

TABLE 3

|  | Example 4 | Example 5 |
|---|---|---|
| composition |  |  |
| zinc carbonate powder (parts) | 150 | 150 |
| physical properties |  |  |
| durometer (JIS A) | 73 | 70 |
| tensile strength (MPa) | 2.9 | 2.5 |
| elongation (%) | 500 | 610 |
| tear strength (A) (N/mm) | 16 | 12 |
| tracking resistance |  |  |
| criterion A (minutes) | ≧360 | ≧360 |
| criterion B (minutes) | ≧360 | ≧360 |
| electrical properties |  |  |
| volume resistivity (Ω-cm) | $1.2 \times 10^{14}$ | $1.5 \times 10^{14}$ |
| dielectric constant | 4.4 | 4.0 |
| dielectric dissipation factor | $1.4 \times 10^{-2}$ | $9.0 \times 10^{-3}$ |

We claim:

1. A heat-curable silicone rubber composition comprising
(A) 100 weight parts polyorganosiloxane gum represented by average compositional formula

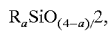

where R represents substituted and unsubstituted monovalent hydrocarbon groups and a is a number from 1.95 to 2.05 and that contains at least 2 silicon-bonded alkenyl groups in each molecule,
(B) 1 to 60 weight parts microparticulate silica,
(C) 50 to 200 weight parts zinc carbonate powder or basic zinc carbonate powder, and
(D) 0.1 to 10 weight parts organoperoxide.

2. A heat-curable silicone rubber composition comprising
(A) 100 weight parts polyorganosiloxane gum represented by average compositional formula

where R represents substituted and unsubstituted monovalent hydrocarbon groups and a is a number from 1.95 to 2.05 and that contains at least 2 silicon-bonded alkenyl groups in each molecule,
(B) 1 to 60 weight parts microparticulate silica,
(C) 50 to 200 weight parts zinc carbonate powder or basic zinc carbonate powder,
(D) 0.1 to 10 weight parts organoperoxide, and
(E) 5 to 200 weight parts aluminum hydroxide powder.

3. A heat-curable silicone rubber composition according to claim 1 where the surface of component (C) has been treated with an organosilicon compound selected from the group consisting of organosilanes, organosilazanes, organosiloxane oligomers, and mixtures thereof.

4. A heat-curable silicone rubber composition according to claim 2 where the surface of component (C) has been treated with an organosilicon compound selected from the group consisting of organosilanes, organosilazanes, organosiloxane oligomers, and mixtures thereof.

5. A heat-curable silicone rubber composition according to claim 2, where the surface of component (E) has been treated with an organosilicon compound selected from the group consisting of organosilanes, organosilazanes, organosiloxane oligomers, and mixtures thereof.

6. A heat-curable silicone rubber composition according to claim 1, where component (B) has a surface area≧50 m$^2$/g.

7. A heat-curable silicone rubber composition according to claim 1, where component (B) comprises 10 to 60 weight parts per 100 weight parts of component (A).

8. A heat-curable silicone rubber composition according to claim 1, where component (C) has a particle size within the range of from 0.1 to 50 micrometers.

9. A heat-curable silicone rubber composition according to claim 2, where component (B) has a surface area≧50 m$^2$/g.

10. A heat-curable silicone rubber composition according to claim 2, where component (B) comprises 10 to 60 weight parts per 100 weight parts of component (A).

11. A heat-curable silicone rubber composition according to claim 2, where component (C) has a particle size within a range of from 0.1 to 50 micrometers.

12. A heat-curable silicone rubber composition according to claim 2, where component (E) has a particle size within a range of from 0.1 to 10 micrometers.

* * * * *